United States Patent
Brown et al.

(10) Patent No.: US 6,549,221 B1
(45) Date of Patent: Apr. 15, 2003

(54) USER INTERFACE MANAGEMENT THROUGH BRANCH ISOLATION

(75) Inventors: Frances C. Brown, Austin, TX (US); Richard S. Schwerdtfeger, Round Rock, TX (US); Lawrence F. Weiss, Round Rock, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/458,643

(22) Filed: Dec. 9, 1999

(51) Int. Cl.7 ................................................. G09G 5/00
(52) U.S. Cl. .................... 345/854; 345/760; 345/762; 345/764; 345/767; 345/853; 345/854
(58) Field of Search ................................ 345/760, 762, 345/763, 764, 853, 835, 854, 767

(56) References Cited

U.S. PATENT DOCUMENTS

| | | | |
|---|---|---|---|
| 4,710,763 A | * 12/1987 | Franke et al. | 345/10 |
| 5,247,651 A | 9/1993 | Clarisse | |
| 5,610,653 A | 3/1997 | Abecassis | |
| 5,619,632 A | * 4/1997 | Lamping et al. | 345/441 |
| 5,701,137 A | * 12/1997 | Kiernan et al. | 345/853 |
| 5,748,186 A | 5/1998 | Raman | 707/500.1 |
| 5,805,171 A | 9/1998 | St. Clair et al. | |
| 5,819,243 A | * 10/1998 | Rich et al. | 706/11 |
| 5,893,109 A | 4/1999 | DeRose et al. | 707/104 |
| 5,956,736 A | 9/1999 | Hanson et al. | 707/513 |
| 6,055,544 A | * 4/2000 | Derose et al. | 707/104 |
| 6,144,962 A | * 11/2000 | Weinberg et al. | 707/10 |
| 6,189,019 B1 | 2/2001 | Blumer et al. | 707/513 |
| 6,219,053 B1 | * 4/2001 | Tachibana et al. | 345/835 |
| 6,337,702 B1 | * 1/2002 | Bates et al. | 345/857 |
| 6,340,977 B1 | * 1/2002 | Lui et al. | 345/709 |
| 6,356,902 B1 | * 3/2002 | Tan et al. | 707/10 |

OTHER PUBLICATIONS

Written Opinion, application No. SG 200006806–4, mailed Jul. 15, 2002.
Using Microsoft Word 5.5, IBM Version, 1990, pp. 329–353.
Word 97 for Windows for Dummies, 1996, pp. 315–322.

* cited by examiner

Primary Examiner—John Cabeca
Assistant Examiner—Cuong T. Thai
(74) Attorney, Agent, or Firm—Kevin L. Daffer; Conley, Rose & Tayon P.C.; Marilyn S. Dawkins

(57) ABSTRACT

Systems and methods for presenting (e.g., displaying) a hierarchical structure are presented. The hierarchical structure includes multiple elements and defines hierarchical relationships between the elements. The hierarchical structure may be embodied within an electronic document such as a Web document, an interactive application program, or a map divided into sections. Each element has a "presentation property" which may be a value or a function. One of the elements has "focus" (e.g., as created, by default, etc.). A "branch isolation" method includes forming a tree-like model of the hierarchical structure having multiple nodes and at least one branch. Each node represents one of the elements. One node is a root node and occupies a highest level in the hierarchical structure. A given branch connects a first node in a first level to a second node in a level directly below the first level. Each branch represents a hierarchical relationship between connected nodes. A "focus node" represents the element receiving focus. A "path" in the model from the root node to the focus node is determined. The presentation property of the element represented by the root node is selectively presented. The presentation property of each element represented by a node, other than the root node, along the path from the root node to the focus node is also presented. The presentation property of each element represented by a node in a subtree is also presented, wherein the focus node is a root node of the subtree.

31 Claims, 9 Drawing Sheets

USER INTERFACE MANAGEMENT THROUGH BRANCH ISOLATION

Cross-Reference to Related Application

This application relates to a co-pending application, Ser. No. 09/458,641, filed on the same day as the present application and entitled "USER INTERFACE MANAGEMENT THROUGH VIEW DEPTH" by Frances C. Brown, Richard S. Schwerdtfeger and Lawrence F. Weiss.

BACKGROUND OF THE INVENTION

1. Field of the Invention

This invention relates to computers, and more particularly to computer systems and networks which access a document and present the document to a user.

2. Description of Related Art

Relatively small computing devices and/or communication devices are becoming increasingly common. Examples of such relatively small devices include palmtop computers, handheld computers, and wireless communication devices such as cellular telephones. Such relatively small devices may not have display devices, or the display devices may be relatively small. Such relatively small devices may also have limited memory and/or processing capability.

The World Wide Web, known simply as the "Web", is a network of Internet servers that provide specially formatted electronic documents to various "client" machines. Web servers currently support documents formatted in a text-based markup language called hypertext markup language (HTML).

In order to provide Web access to "client machines" with limited capabilities (e.g., palmtop or handheld computers), a "transcoder proxy" is typically positioned between the client machine and an Internet server. The transcoder proxy may, for example, provide selected portions of a requested Web document to the client machine based upon the capabilities of the client machine. In doing so, the transcoder proxy may translate one or more selected portions of the Web document from one digital format to another.

FIG. 1 is a block diagram of a system 10 currently used to provide an electronic document 12 to a client machine 14. Electronic document 12 may be, for example, a Web page or an interactive application program (e.g., an electronic form to be filled out by a user in order to obtain user information). System 10 includes an internet server 16 and a transcoder proxy 18 interposed between client machine 14 and internet server 16. Transcoder proxy 18 forwards a request for document 12 from client machine 14 to internet server 16. Such a request typically includes a uniform resource locator (URL) of document 12 specifying the internet protocol (IP) address of document 12 and the name of the file containing document 12.

Internet server 16 fetches document 12 and provides document 12 to transcoder proxy 18. Transcoder proxy 18 translates document 12 from one digital format (e.g., hypertext markup language or HTML) to a script written in a scripting language understood by a Web browser application program running within client machine 14. The Web browser program may use information conveyed by the script to display document 12 upon a display device of client machine 14. Alternately, the Web browser program may use information conveyed by the script to output the contents of document 12 as speech through a speaker of client machine 14.

A problem arises when client machine 14 has limited memory, processing capability, and/or display capability, and document 12 is large enough to exceed one or more of the limited capabilities of client machine 14. Client machine 14 may be, for example, a palmtop or handheld computer with limited memory, processing capability, and/or display capability. Much effort is being expended to develop methods for transforming or adapting the content of large documents to the capabilities of limited client machines 14. Known content transformation methods include displaying short text descriptions in place of images, converting images to links, converting tables to bulleted lists, removing features-not supported by a device (e.g., JAVASCRIPT™ applets), removing references to image types not supported by a device, converting joint photographic experts group (JPEG) images to graphics interchange format (GIF) images for devices supporting only GIF images, transcoding GIF and JPEG images by reducing scale and/or color level, and summarizing text elements.

It would be desirable to have a system and method for delivering an electronic document 12 (e.g., a Web page) to a client machine 14 based upon a structure of document 12 and/or the capabilities of client machine 14.

SUMMARY OF THE INVENTION

Several different methods for presenting (e.g., displaying) a hierarchical structure are presented. The hierarchical structure includes multiple elements, and defines hierarchical relationships between the elements. The hierarchical structure may be embodied within an electronic document such as a Web document, an interactive application program, or a map divided into sections. Each element has a "presentation property" which may be a value or a function. A single one of the elements has "focus" (e.g., in accordance with the coding of the document by an author, by default, etc.).

A first embodiment of a "branch isolation" method for presenting the hierarchical structure includes forming a model of the hierarchical structure. The model includes multiple levels ranked with respect to one another, multiple nodes, and at least one branch. Each node represents a single one of the elements. One of the nodes is a root node and occupies a highest level in the hierarchical structure. A given branch connects a first node in a first level to a second node in a level directly below the first level. Each branch represents a hierarchical relationship between the nodes connected by the branch.

The term "focus node" is used to describe the node representing the element receiving focus. In the embodiment of the branch isolation method, a "path" in the model from the root node to the focus node is determined. The path is a route from the root node to the focus node formed along branches. The presentation property of the element represented by the root node is selectively presented. For example, the hierarchical structure may be a hypertext markup language (HTML) document, and the presentation property of the root node may simply be "<BODY>". In this case, the presentation property of the root node conveys little information, and may not be presented.

Once the presentation property of the element represented by the root node has been selectively presented, the presentation property of each element represented by a node, other than the root node, along the path from the root node to the focus node is presented. The presentation property of each element represented by a node in a level lower than the level of the focus node and coupled to the focus node by one or more branches is then presented.

The model may be a tree structure. In this case, the nodes in levels lower than the level of the focus node and coupled to the focus node by one or more branches comprise a "subtree" of the tree structure, wherein the focus node is the root node of the subtree. The nodes in levels lower than the level of the focus node and coupled to the focus node by one or more branches may thus be described as "nodes in a subtree of the tree structure, wherein the focus node is the root node of the subtree."

An embodiment of an electronic document delivery system is described including a client machine coupled to (i.e., in wired or wireless communication with) a transcoder proxy. The client machine may be, for example, a palmtop or handheld computer or a wireless communication device with limited memory and/or processing capability. The transcoder proxy is coupled to receive electronic documents. Each electronic document includes one or more elements, and is expressed in a first digital format (e.g., a text-based markup language such as HTML or extensible markup language, XML).

A second embodiment of the branch isolation method, which may be embodied within the transcoder proxy, includes receiving the hierarchical structure (e.g., as an electronic document) expressed in the first digital format (e.g., a text-based markup language such as HTML or extensible markup langauge/XML). A tree model of the hierarchical structure is formed as described above. The tree model is used to produce an original script expressed in a second digital format (e.g., a scripting language). The original script includes the presentation properties of at least a portion of the elements represented by nodes: (i) along a first path from the root node to an original focus node, wherein the original focus node is the node representing the element having focus, and (ii) within a first subtree of the tree model, wherein the original focus node is a root node of the first subtree. The original script is then provided (e.g., to the client machine).

The method may also include receiving an event, wherein the event signals a change in the element having focus. In response to the event, the tree model may be used to produce a new script expressed in the second digital format. The new script includes the presentation properties of at least a portion of the elements represented by nodes: (i) along a second path from the root node to a new focus node, wherein the new focus node is the node representing the element having focus as a result of the change in focus signaled by the event; and (ii) within a second subtree, wherein the new focus node is a root node of the second subtree. The new script is provided (e.g., to the client machine).

A third embodiment of the branch isolation method, which may be embodied within the client machine, includes receiving the original script derived from the tree model of the hierarchical structure as described above. The presentation properties within the original script are presented. The third method may also include generating an event in response to user input, wherein the event signals a change in the element having focus. The event may be provided (e.g., to the transcoder proxy). The new script, expressed in the second digital format and derived from the tree model as described above, may be received (e.g., from the transcoder proxy). The presentation properties within the new script may be presented.

A view depth method for presenting the hierarchical structure is also described. The branch isolation and the view depth methods may be combined. One embodiment of the combination includes accessing the hierarchical structure and forming the model of the hierarchical structure as described above. A first portion of the model is selected according to the branch isolation method and including: (i) nodes along a path from the root node to the focus node, and (ii) nodes in a level lower than the level of the focus node and coupled to the focus node by one or more branches. A second portion of the model is selected according to the view depth method, including: (i) nodes in the same level as the focus node, and (ii) nodes in a selected number of levels higher than the level of the focus node. The presentation properties of elements represented by nodes within both the first and second portions of the model are presented. Where the root node is within both the first and second portions of the model, the presentation property of the element represented by the root node may be selectively presented.

Two embodiments of a computer system employing the branch isolation and/or view depth methods for presenting a hierarchical structure are described. Both embodiments of the computer system include a host application coupled to a client application. The host application and the client application may be separate software programs being executed (i.e., running) simultaneously within the computer system. The host application may be, for example, a Web browser. The client application may be, for example, an assistive technology interface. In both embodiments, the computer system includes a hierarchical structure as described above. The host application is coupled to the hierarchical structure. In other embodiments, the hierarchical structure may be external to the computer system, and the host application may be coupled to receive or access the hierarchical structure.

The host application accesses the hierarchical structure, and forms a tree model (i.e., a tree) of the hierarchical structure. In a first embodiment of the computer system, the tree resides within the host application. The tree includes nodes and branches as described above.

In order to present a portion of the hierarchical structure, the client application accesses the tree within the host application. The client application may embody the branch isolation method described above. In this case, the client application determines a path in the model from the root node to the focus node. The client application generates a set of presentation properties. The set of presentation properties may or may not include the presentation property of the root node for the reasons described above. The set of presentation properties includes the presentation property of each element represented by a node, other than the root node, along the path from the root node to the focus node. The set of presentation properties also includes the presentation property of each element represented by a node in a level lower than the level of the focus node and coupled to the focus node by one or more branches (i.e. in a subtree of the tree, wherein the focus node is the root node of the subtree). The client application may also embody a combination of the branch isolation and view depth methods described above.

The client application provides the set of presentation properties to a user agent of the computer system. The client application may function as an interface between the host application and the user agent. The user agent may function as an interface between the client application and an output device of the computer system. The output device may be, for example, a Braille display or a text-to-speech converter. The Braille display may be the output device of choice for a visually challenged user (e.g., a user with a permanent or temporary visual impairment). The user agent may also function as an interface between the client application and an input device of the computer system. The input device may be, for example, a speech-to-text converter. The speech-to-text converter may, for example, be the input device of choice for a physically challenged user (e.g., a permanently or temporarily disabled user who cannot operate a conventional input device such as a mouse or a keyboard due to a disability). The user agent uses the set of presentation properties to produce output commands, and provides the output commands to the output device. As a result, the portion of the hierarchical structure is displayed or otherwise presented by the output device.

In the second embodiment of the computer system, the tree resides within the client application. The client application accesses the hierarchical structure via the host application, and forms the tree. The client application accesses the tree to form a set of presentation properties as described above, and provides the set of presentation properties to the user agent.

BRIEF DESCRIPTION OF THE DRAWINGS

Other objects and advantages of the invention will become apparent upon reading the following detailed description and upon reference to the accompanying drawings in which.

Figure 1:
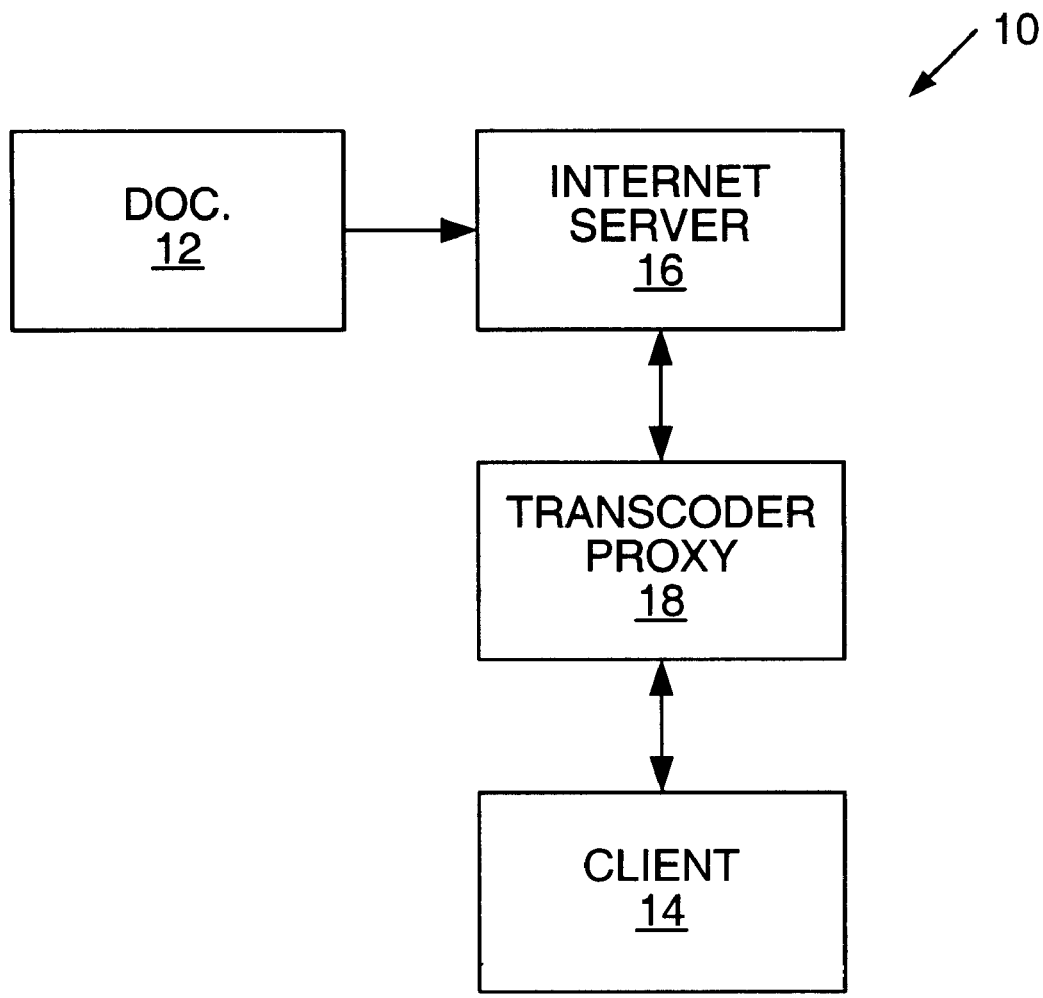
FIG. 1 is a block diagram of a system currently used to provide an electronic document to a client machine.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
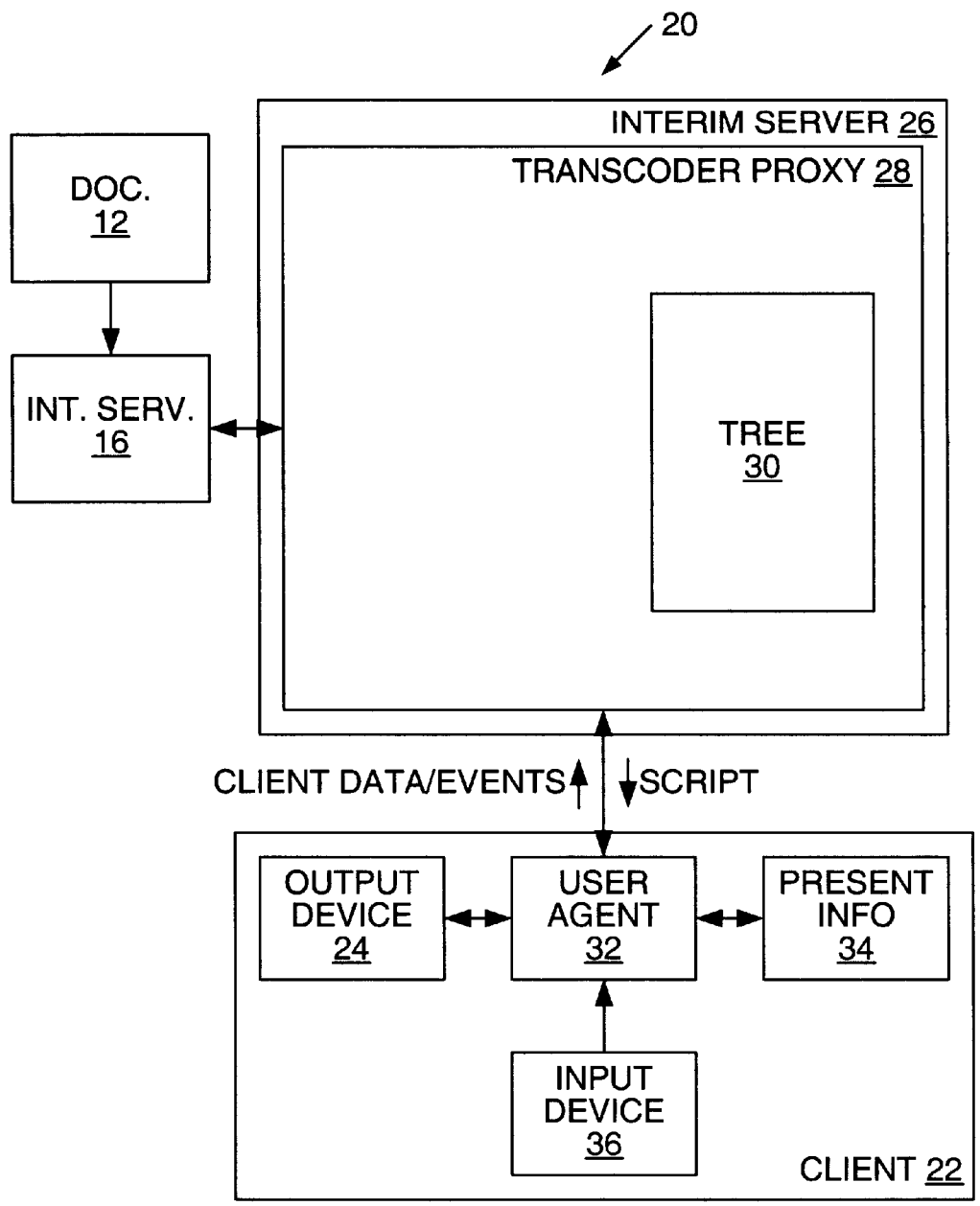
FIG. 2 is a block diagram of an embodiment of a system for providing electronic document to a client machine, wherein the electronic document has a hierarchical structure, and wherein a tree model or "tree" is used to represent the hierarchical structure of the electronic document.

FIG. 2 is a block diagram of an embodiment of a system 20 for providing electronic document 12 to a client machine 22. In general, electronic document 12 has a hierarchical structure including multiple elements, and defines hierarchical relationships between the elements. Electronic document 12 may be, for example, a Web page, an interactive application program (e.g., an electronic form to be filled out by a user in order to obtain user information), or a map divided into sections. Client machine 22 may be, for example, a palmtop computer, a handheld computer, a personal digital assistant (PDA), or a wireless communication device, and may have limited memory and/or processing capability. In the embodiment of FIG. 2, client machine 22 includes an output device 24. Output device 24 may include a relatively small display device with limited display capabilities. Output device 24 may also include a speaker for producing speech.

In the embodiment of FIG. 2, system 20 includes internet server 16 and an interim server 26 coupled between client machine 22 and internet server 16. Interim server 26 includes a transcoder proxy 28. Transcoder proxy 28 forwards a request for an electronic document (e.g., document 12) from client machine 22 to internet server 16. As described above, such a request typically includes a uniform resource locator (URL) of document 12 specifying the internet protocol (IP) address of document 12 and the name of the file containing document 12. Internet server 16 fetches document 12 and provides document 12 to transcoder proxy 28. Transcoder proxy 28 receives document 12 from internet server 16 in a digital format. Well known digital formats include text-based markup language formats such as hypertext markup language (HTML) and extensible markup language (XML). Other common digital formats include POSTSCRIPT (™ Adobe Sys. Inc., San Jose, Calif.), portable document format (PDF), and advanced function printing (AFP).

Electronic document 12 includes multiple elements representing document structures. For example, electronic document 12 may be a Web page including elements such as paragraphs, hypertext links, lists, tables, and/or images. The elements of document 12 form a hierarchy, and electronic document 12 defines hierarchical relationships between the elements. Electronic document 12 may be represented by a tree structure. Transcoder proxy 28 parses the elements of document 12, forms a tree 30, and stores tree 30, wherein tree 30 is a representation or model of the hierarchical structure of document 12. Transcoder proxy uses tree 30 to produce script written in a scripting language understood by user agent 32 (e.g., a Web browser application program running within client machine 22).

The scripting language may be, for example, a subset of the digital format in which transcoder proxy 28 receives document 12 from internet server 16 (e.g., a subset of HTML, XML, POSTSCRIPT, or PDF). In producing the script, transcoder proxy 28 may covert graphics images within electronic document 12 from one format to another (e.g., from joint photographic experts group/JPEG format to graphics interchange format/GIF format, from JPEG and GIF formats to scaled vector graphics/SVG format, etc.). The script may also include audio data files (e.g., wav files), transcoded Braille, and/or unformatted text.

Each element of electronic document 12 has a "presentation property". The presentation property of a given element may be a value (e.g., a name or title of the element) or a function (e.g., one or more instructions or statements which are executed in order to present the element). Transcoder proxy 28 may, for example, translate an image to a set of drawings commands used to present or render the image. In this case, the presentation property of the image is a function including the set of drawing commands. As will be described in more detail below, the script produced by transcoder proxy 28 includes the presentation properties of the elements within a selected portion of document 12. Transcoder proxy 28 provides the produced script to user agent 32. In response to the received script, user agent 32 of client machine 22 produces presentation information 34.

User agent 32 uses presentation information 34 to issue output commands to output device 24.

Figure 3:
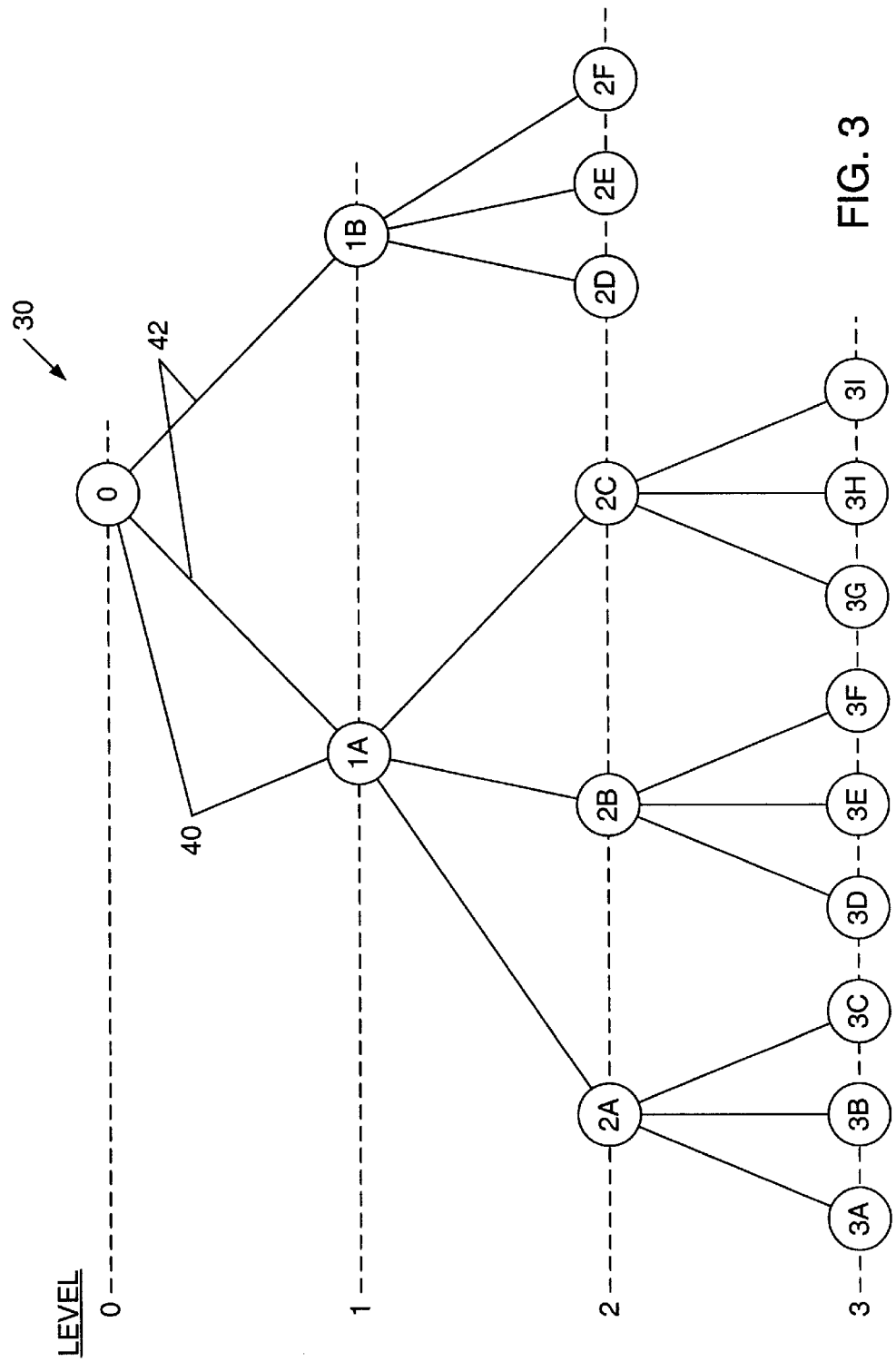
FIG. 3 is a diagram of an exemplary tree of FIG. 2.

FIG. 3 is a diagram of an exemplary tree 30 of FIG. 2 representing the hierarchical structure of a corresponding electronic document 12. Tree 30 includes the elements of document 12 and conveys the hierarchical relationships between the elements of document 12. In technical terms, tree 30 is a connected graph which contains no circuits or cycles. A graph is a geometric diagram consisting of a finite number of "nodes" or "vertices" joined by line segments called "branches" or "edges". A connected graph is a graph in which it is possible to form a "path" between any two nodes or vertices. A circuit or cycle is a path which begins and ends with the same node or vertex.

Tree 30 of FIG. 3 includes nodes 40 and branches 42. Nodes 40 represent the elements of document 12. Nodes 40 exist at different levels within tree 30. Each branch 42 interconnects two nodes 40 at different levels. Tree 30 includes a "root" node labeled "0" at a level 0 of tree 30 in FIG. 3. Node 0 is the "parent" of nodes 1A and 1B at a level 1, and nodes 1A and 1B are "siblings". Nodes 2A, 2B, and 2C are "children" of node 1A. Similarly, nodes 2D–2F are children of node 1B. Nodes 3A–3C are the children of node 2A, nodes 3D–3F are the children of node 2B, and nodes 3G–3I are the children of node 2C. Nodes 2D–2F and nodes 3A–3I have no children, and are called "leaf" or "external" nodes. All nodes 40 having at least one child node are called "internal" nodes.

For example, document 12 may be an HTML document containing a table element and a list element. Node 0 of tree 30 may represent document 12 as a whole (e.g., a body element of document 12). Node 1A may represent the table element, and node 1B may represent the list element. Nodes 2A–2C, the children of node 1A, may respectively represent row elements of (e.g., presented values within) a first row, row elements of a second row, and the header elements of the table element. The three child nodes of Node 2A, nodes 3A–3C, may each represent a different row element of the first row of the table element. The three child nodes of Node 2B, nodes 3D–3F, may each represent a different row element of the second row of the table element. The three child nodes of Node 2C, nodes 3G–3I, may each represent a different header element of the table element.

Figure 4:
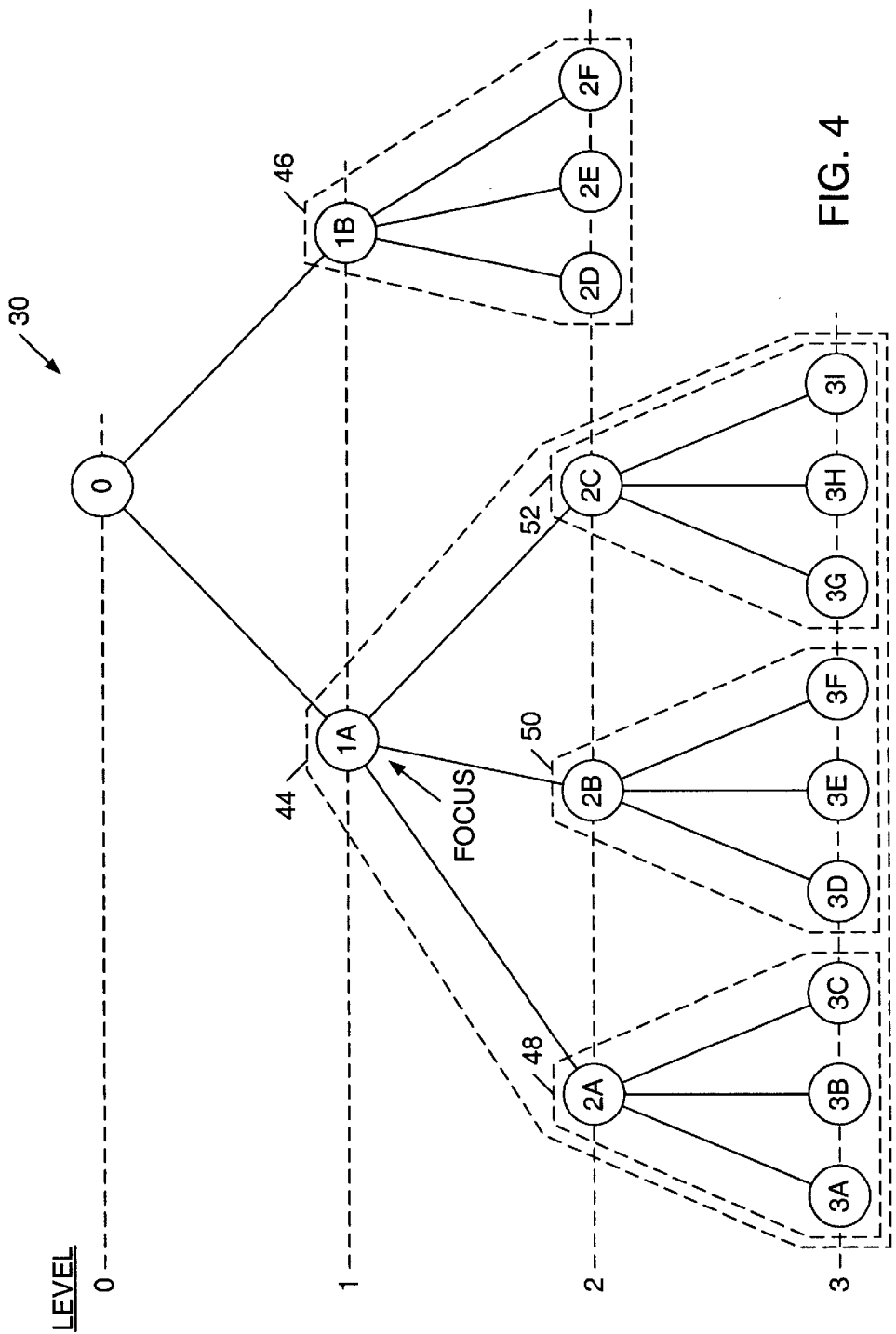
FIG. 4 is a diagram of the exemplary tree of FIG. 3 further illustrating the structure of the tree.

FIGS. 2 and 4 will now be used to describe a first "branch isolation" method for providing a portion of document 12 to client machine 22 based upon a structure of document 12 and/or the capabilities of client machine 22. The branch isolation method may be embodied within transcoding proxy 28 of FIG. 2. During system initialization and/or during system operation, user agent 32 may provide client data to transcoder proxy 28. The client data may include information conveying capabilities of client machine 22 (e.g., memory size, processing capability, display size, etc.). Transcoder proxy 28 may implement the branch isolation method based upon the client data received from client machine 22.

FIG. 4 is a diagram of exemplary tree 30 of FIG. 3 further illustrating the structure of tree 30. As described above, node 0 is the root node of tree 30. Tree 30 of FIG. 4 includes a first subtree 44 and a second subtree 46. Node 1A, a child of node 0, is the root of first subtree 44. Node 1B, the other child of node 0, is the root of second subtree 46. Subtree 44 includes node 1A, the child nodes 2A–2C of node 1A, and the child nodes 3A–3C of node 2A, child nodes 3D–3F of node 2B, and child nodes 3G–3I of node 2C. Subtree 46 includes node 1B and child nodes 2D–2F of node 1B.

Tree 30 of FIG. 4 also includes a third subtree 48, a fourth subtree 50, and a fifth subtree 52. Node 2A, a child of node 1A, is the root of third subtree 48. Subtree 48 includes node 2A and child nodes 3A–3C of node 2A. Node 2B, another child of node 1A, is the root of fourth subtree 50. Subtree 50 includes node 2B and child nodes 3D–3F of node 2B. Node 2C, the third child of node 1A, is the root of fifth subtree 52. Subtree 52 includes node 2C and child nodes 3G–3I of node 2C.

According to the coding of document 12 by an author, a single one of the elements of document 12 initially has focus within document 12. In FIG. 4, the element represented by node 1A initially has focus. As will be described in more detail below, the focus, modifiable via user input, is used to provide a select portion of document 12 to client machine 22. Implementing the branch isolation method, transcoder proxy 28 may translate the selected portion of document 12 from one digital format (e.g., HTML, POSTSCRIPT, PDF, etc.) to a script written in a scripting language understood by user agent 32 (e.g., a Web browser) within client machine 22, and provide the script to user agent 32.

The branch isolation method includes determining a path from the root node of the tree (e.g., node 0 of tree 30) to the node representing the element receiving focus. For example, in FIG. 4, the element represented by node 1A initially has focus as described above. A "path" from a node A to a node B is a sequence of nodes from node A to node B. In a tree structure, there can be only one path from the root node to any other node in the tree. In FIG. 4, the path from root node of tree 30 (node 0) and node 1A is the node sequence (0,1A).

The branch isolation method also includes invoking the elements represented by nodes along the path from the root node to the node representing the element receiving focus, as well as the nodes of any subtree of which the node representing the element receiving focus is a root. To invoke an element is to exercise a presentation property (e.g., a value or function) of the element.

For example, referring to FIGS. 2 and 4, transcoder proxy 28 receives document 12 and forms tree 30, a hierarchical representation of document 12. Document 12 may be, for example, an HTML document, and node 0 may represent a body of document 12. Node 1A may represent a table element of document 12, and initially has focus as indicated in FIG. 4 and described above. In this case, transcoder proxy 28 may carry out the branch isolation method, dependent upon received client data, by invoking the elements represented by nodes along the path from the root node 0 to the node 1A, representing the element receiving focus, as well as the nodes of subtree 44, in order to produce script.

For example, the element represented by node 0 may have a value which is the HTML tag "<BODY>". Transcoder proxy 28 may invoke the element represented by node 0, thereby obtaining the value "<BODY>" of the element. Transcoder 28 may or may not include the "<BODY>" value in the script.

The element represented by node 1A may have a value which is the HTML tag "<TABLE>". Transcoder proxy 28 may invoke the element represented by node 1A, thereby obtaining the value "<TABLE>" of the element. Transcoder 28 may include the "<TABLE>" value in the script in order to present the table.

Node 1A, receiving initial focus, is the root node of subtree 44. In carrying out the branch isolation method, transcoder proxy 28 may invoke all of the elements of subtree 44. Such invocation results in the row elements of the first and second rows of the table, and the header elements of the table. Transcoder 28 may include the row elements of the first and second rows, and the header elements, in the script to present the table.

As described above, the script produced by transcoder proxy 28 includes presentation properties (e.g., values or functions) of the elements within the selected portion of document 12. Transcoder proxy 28 provides the produced script to user agent 32. In response to the received script, user agent 32 of client machine 22 produces presentation information 34. User agent 32 uses presentation information 34 to issue output commands to output device 24. As described above, output device 24 may include a relatively small display device with limited display capabilities. Output device 24 may also include a speaker for producing speech.

Referring back o FIG. 2, client machine 22 also includes an input device 36 coupled to user agent 32. Input device 36 may be, for example, one or more keys or buttons, a pointing device such as a mouse, or a speech-to-text converter. A user input via input device 36 may cause user agent 32 to generate an event. The event may result in a change of focus within document 12. For example, the user may click a mouse button while the pointer or cursor is upon a row element of the table not currently receiving focus, thereby changing the focus to the row element of the table. As indicated in FIG. 2, user agent 32 may provide the event to transcoder proxy 28. The user may also press a key which transfers focus to a next link in document 12.

It is noted that client machine 22 may include other input, output, and/or input/output (I/O) devices not shown. It is also noted that input device 36 and output device 24 may be a combined I/O device, such as a speech engine which converts digital signals representing text to speech and also converts speech to digital signals representing text, or a touch screen I/O device which includes a visual display screen and accepts user input via pressure applied to the display screen (e.g., via a stylus).

In response to the change in focus, transcoder proxy 28 may reapply the branch isolation method using the element currently receiving focus, thereby responding to the change in focus by producing new script and providing the new script to client machine 22. In response to the new script, user agent 32 of client machine 22 may produce new presentation information 34, and use the new presentation information 34 to issue new output commands to output device 24.

For example, in FIG. 4, should focus change from the table element represented by node 1A to the row element of the first row of the table represented by node 3A (e.g., via an event generated in response to user input), transcoder proxy 28 may reapply the branch isolation method. Transcoder proxy 28 may thus determine a path from root node 0 to node 3A, invoke the elements along the path as well as the elements represented by the nodes of any subtree of which node 3A is a root node in order to produce new script, and provide the new script to client machine 22.

Figure 5:
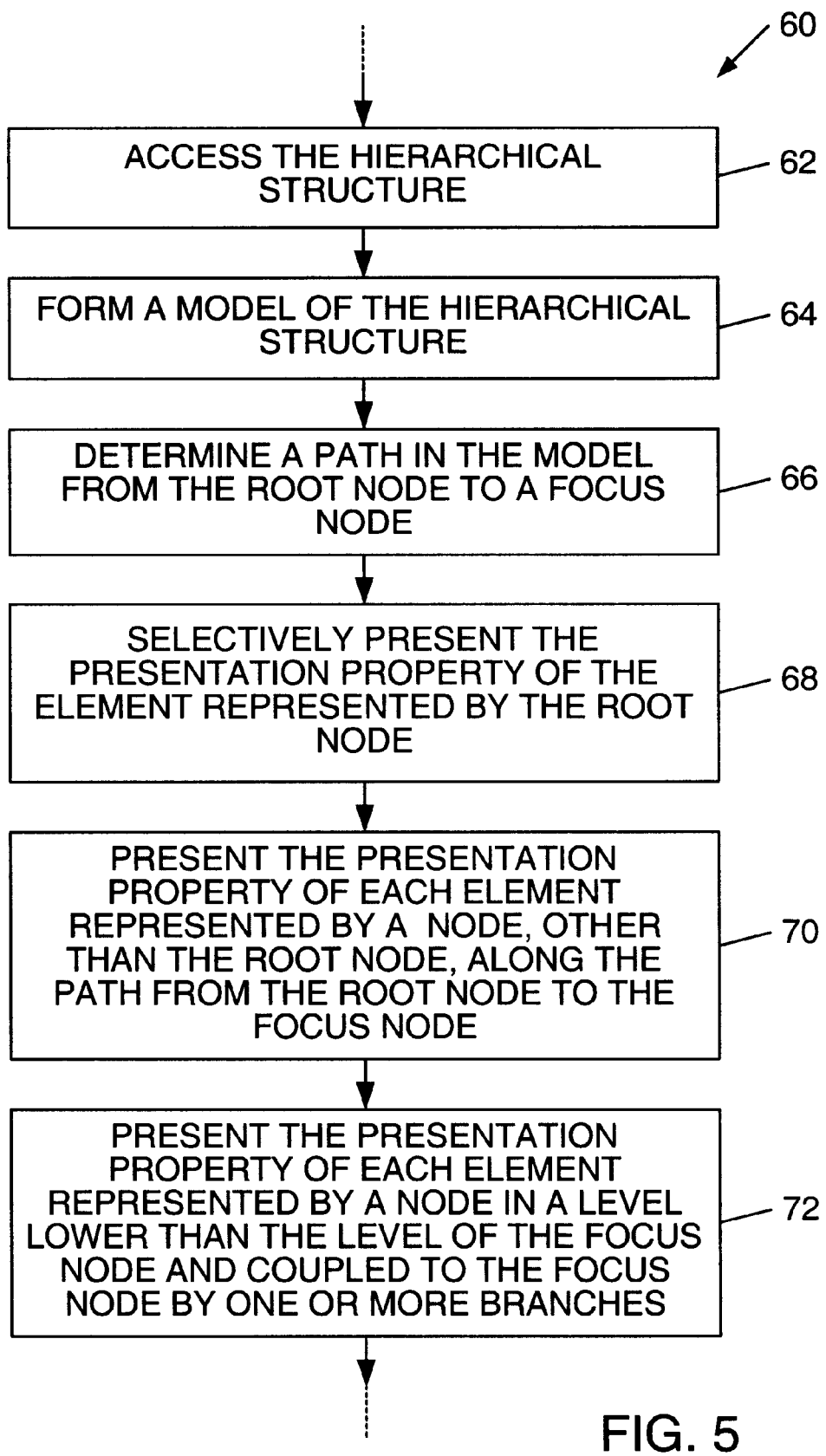
FIG. 5 is a flow chart of one embodiment of a "branch isolation" method for presenting a hierarchical structure.

FIG. 5 is a flow chart of one embodiment of a "branch isolation" method 60 for presenting a hierarchical structure (e.g., an electronic document such as a Web page, and interactive application program, or a map divided into sections). During a step 62, the hierarchical structure is accessed. The hierarchical structure includes multiple elements and defines hierarchical relationships between the elements. As described above, each element has a presentation property, and a single one of the elements has focus.

A model of the hierarchical structure is formed during a step 64. The model includes multiple levels ranked with respect to one another, multiple nodes, and at least one branch. Each node represents a single one of the elements. One of the nodes is a root node and occupies a highest level (e.g., node 0 in level 0 of FIGS. 3 and 4). A given branch connects a first node in a first level to a second node in a level directly below the first level. Each branch represents a hierarchical relationship between the nodes connected by the branch.

The model may be a tree structure. In this case, the nodes in levels lower than the level of the focus node and coupled to the focus node by one or more branches comprise a "subtree" of the tree structure, wherein the focus node is the root node of the subtree. The nodes in levels lower than the level of the focus node and coupled to the focus node by one or more branches may thus be described as "nodes in a subtree of the tree structure, wherein the focus node is the root node of the subtree."

During a step 66, a path in the model from the root node to a "focus node" is determined, wherein the focus node is the node representing the element having focus. The path is a route from the root node to the focus node formed along branches. The presentation property of the element represented by the root node is selectively presented. For example, the hierarchical structure may be a hypertext markup language (HTML) document, and the presentation property of the root node may simply be "<BODY>". In this case, the presentation property of the root node conveys little information, and may not be presented.

The presentation property of each element represented by a node, other than the root node, along the path from the root node to the focus node is presented in a step 70. During a step 72, the presentation property of each element represented by a node in a level lower than the level of the focus node and coupled to the focus node by one or more branches is presented.

Figure 6:
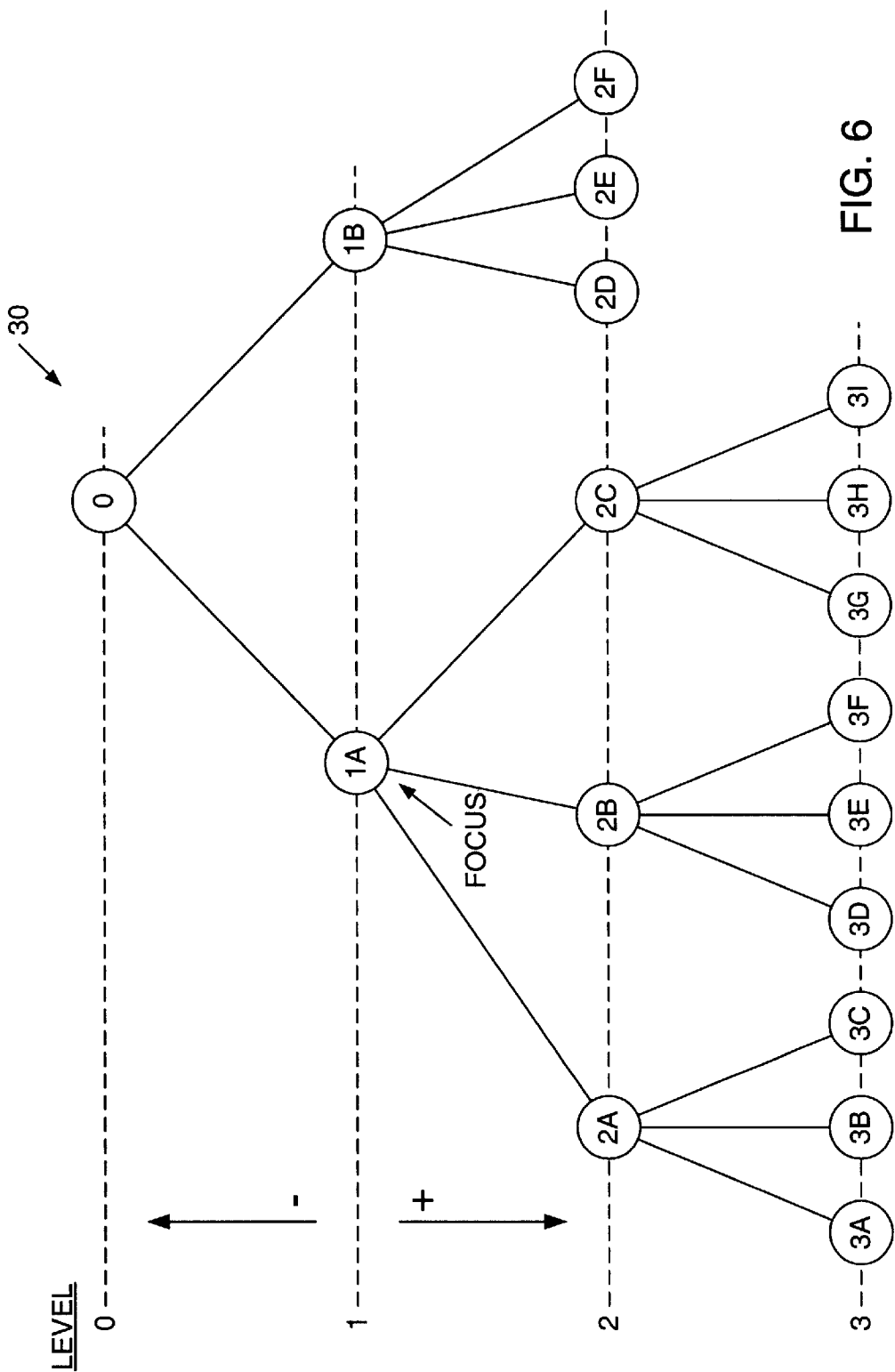
FIG. 6 is a diagram of the exemplary tree of FIG. 3 emphasizing multiple levels of the tree.

FIGS. 2 and 6 will now be used to describe a second "view depth" method for providing a portion of document 12 to client machine 22 based upon a structure of document 12 and/or the capabilities of client machine 22. The view depth method may be embodied within transcoding proxy 28 of FIG. 2. Transcoder proxy 28 may implement the view depth method based upon the client data received from client machine 22.

FIG. 6 is a diagram of exemplary tree 30 of FIG. 3 emphasizing the multiple levels of tree 30. As described above, the element represented by node 1A initially has focus according to the coding of document 12 by the author. In the view depth method, the portion of document 12 provided to client machine 22 is dependent upon the level of tree 30 containing the node representing the element receiving focus. Specifically, the portion of document 12 provided to client machine 22 includes the elements represented by nodes in the level of tree 30 containing the node representing the element receiving focus. The portion of document 12 provided to client machine 22 may also include elements represented by nodes in a variable number of levels greater than the level of tree 30 containing the node representing the element receiving focus and/or elements represented by nodes in a variable number of levels less than the level of tree 30 containing the node representing the element receiving focus.

In FIG. 6, node 1A represents the element receiving initial focus according to the coding of document 12 by the author as described above. Transcoder proxy 28 may carry out the view depth method by invoking the elements represented by nodes 1A and 1B in level 1 of tree 30, the level of tree 30 containing the node 1A representing the element receiving focus. Based upon the client data (e.g., the capabilities of client machine 22 as conveyed by client machine 22), transcoder proxy 28 may also invoke the elements represented by nodes in a variable number of levels greater than level 1 of tree 30 and/or in a variable number of levels less than level 1.

For example, assume transcoder proxy 28 invokes the elements represented by nodes in one level greater than the level of tree 30 containing the node representing the element receiving focus, and one level less than the level containing the node representing the element receiving focus (e.g., based upon the client data provided by client machine 22). As node 1A of FIG. 6 represents the element receiving initial focus, transcoder proxy 28 may carry out the view depth method by invoking the elements represented by: (i) node 0 in level 0, (ii) nodes 1A and 1B in level 1, (iii) nodes 2A–2F in level 2.

The element represented by node 0 may have a value which is the HTML tag "<BODY>". Transcoder proxy 28 may invoke the element represented by node 0, thereby obtaining the value "<BODY>" of the element. Transcoder 28 may or may not include the "<BODY>" value in the script.

The element represented by node 1A may have a value which is the HTML tag "<TABLE>". Transcoder proxy 28 may invoke the element represented by node 1A, thereby obtaining the value "<TABLE>" of the element. Transcoder 28 may choose to include the "<TABLE>" value in the script to indicate to the user of client machine 22 that document 12 includes a table.

The element represented by node 1B may have a value which is the HTML tag "<LI>" for list. Transcoder proxy 28 may invoke the element represented by node 1A, thereby obtaining the value "<LI>" of the element. Transcoder 28 may include the "<LI>" value in the script to facilitate presenting the list.

The element represented by node 2A may have a value which is the HTML tag "<TR>" for table row. Transcoder proxy 28 may invoke the element represented by node 2A, thereby obtaining the value "<TR>" of the element. Transcoder 28 may include the "<TR>" value in the script to indicate to the user of client machine 22 that the table element includes the first row.

The element represented by node 2B may also have a value which is the HTML tag "<TR>" for table row. Transcoder proxy 28 may invoke the element represented by node 2B, thereby obtaining the value "<TR>" of the element. Transcoder 28 may include the "<TR>" value in the script to indicate to the user of client machine 22 that the table element includes the second row.

The element represented by node 2C may have a value "<HEADER>" for table header. Transcoder proxy 28 may invoke the element represented by node 2C, thereby obtaining the value "<HEADER>" of the element. Transcoder 28 may choose to include the "<HEADER>" value in the script to indicate to the user of client machine 22 that the table element includes at least one header.

The elements represented by nodes 2D–2F may have values of list items. Transcoder proxy 28 may invoke the elements represented by nodes 2D–2F, thereby obtaining the list item values of the elements. Transcoder 28 may include the list item values in the script in order to present the list.

As described above, transcoder proxy 28 provides the produced script to user agent 32. In response to the received script, user agent 32 of client machine 22 produces presentation information 34. User agent 32 uses presentation information 34 to issue output commands to output device 24.

As described above, a user input via input device 36 may cause user agent 32 to generate an event. The event may result in a change of focus within document 12. In response to a change in focus, transcoder proxy 28 may reapply the view depth method using the element currently receiving focus, thereby responding to the change in focus by producing new script and providing the new script to client machine 22. In response to the new script, user agent 32 of client machine 22 may produce new presentation information 34, and use the new presentation information 34 to issue new output commands to output device 24.

For example, in FIG. 6, should focus be changed from the table element represented by node 1A in level 1 to a node in level 2 (e.g., node 2A) via an event generated in response to user input, transcoder proxy 28 may reapply the view depth method. Transcoder proxy 28 may invoke the elements represented by nodes in level 2 (i.e., nodes 2A–2F). Based upon the capabilities of client machine 22 as conveyed by the client data provided by client machine 22, transcoder proxy 28 may also invoke the elements represented by nodes in a variable number of levels greater than level 2 of tree 30 and/or elements represented by nodes in a variable number of levels less than level 2.

During system operation, user agent 32 may provide new client data to transcoder proxy 28. The new client data may be generated by user agent 32 in order to increase or reduce the amount of detail presented, and may be generated in response to user input. In response to the new client data, transcoder proxy 28 may change the variable number of levels greater than the level of the node representing the element receiving focus, and/or the variable number of levels less than the level of the node representing the element receiving focus.

Figure 7:
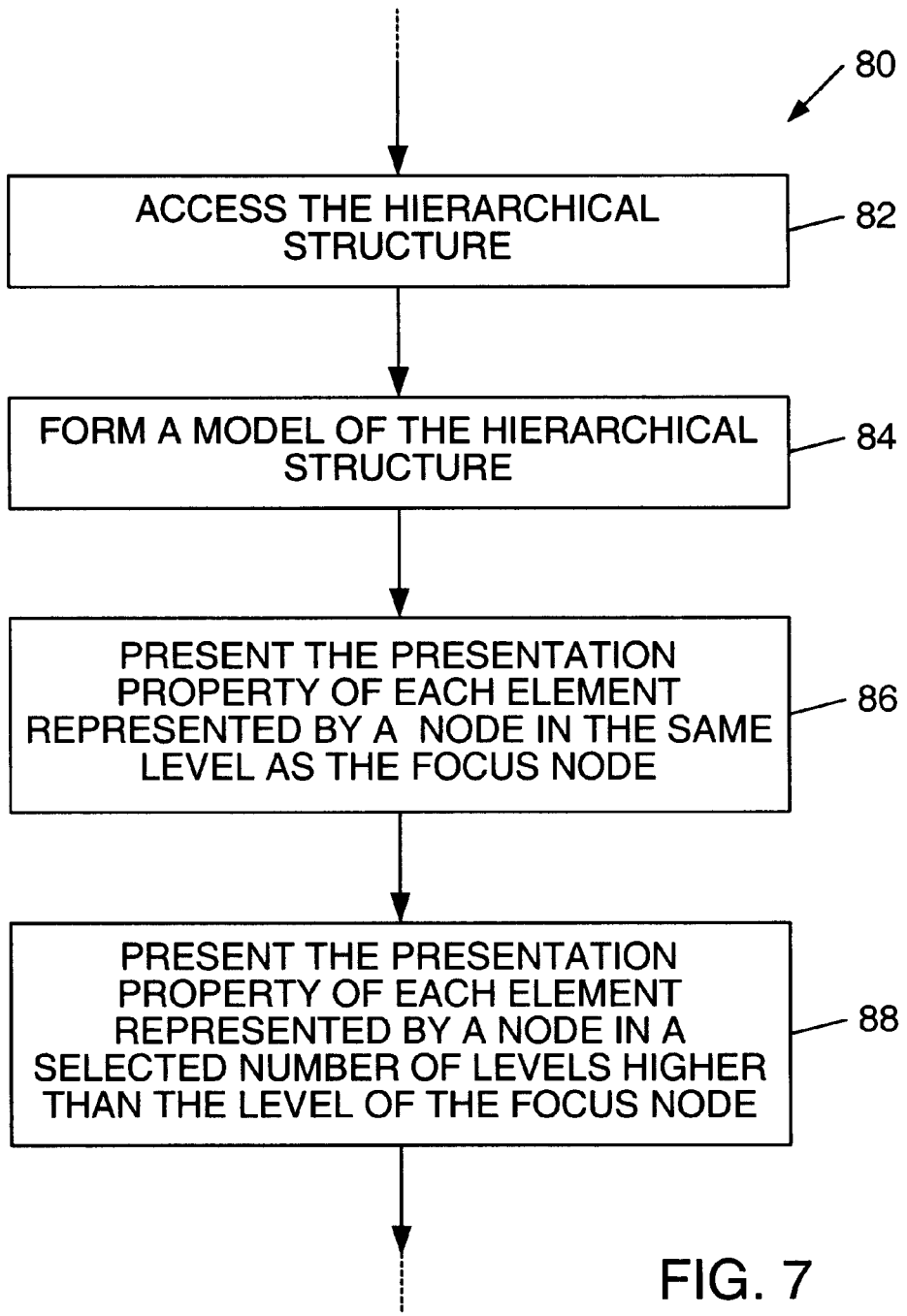
FIG. 7 is a flow chart of one embodiment of a "view depth" method for presenting a hierarchical structure.

FIG. 7 is a flow chart of one embodiment of a "view depth" method 80 for presenting a hierarchical structure (e.g., an electronic document such as a Web page, and intercative application program, or a map divided into sections). During a step 82, the hierarchical structure described above is accessed. A model of the hierarchical structure is formed as described above during a step 84. During a step 86, the presentation property of each element represented by a node in the same level as the focus node is presented, wherein the focus node is the node representing the element having focus. The presentation property of each element represented by a node in a selected number of levels higher than the level of the focus node are presented during a step 88.

The branch isolation method, as described above using FIGS. 4 and 5, and the view depth method, as described above using FIGS. 6 and 7, may be combined (e.g., such that the presented portion of electronic document 12 is within the presentation capabilities of client machine 22). Referring to FIG. 4, with the element represented by node 1A receiving focus, the selected portion of document 12 using the branch isolation method may include the elements represented by root node 0 and subtree 44. As described above, output device 24 may include a relatively small display device with limited display capabilities, and subtree 44 may exceed the display capabilities of output device 24.

In this case, transcoder proxy 28 may invoke only the elements within a selected number of levels of subtree 44. The selected number of levels may depend upon, for example, the client data which conveys the capabilities of client machine 22 (e.g., memory size, processing capability, display size, etc.). Transcoder proxy 28 may first carry out the branch isolation method, thereby selecting the elements represented by root node 0 and subtree 44. Transcoder proxy 28 may then apply the view depth method to subtree 44. As described above, transcoder proxy 28 may be configured to select nodes in the level of tree 30 containing the node representing the element receiving focus, one level greater than the level of tree 30 containing the node representing the element receiving focus, and one level less than the level containing the node representing the element receiving focus. In this case, applying the view depth method to the portion of tree 30 selected using the branch isolation method, transcoder proxy 28 selects node 0 in level 0, node 1A in level 1, and nodes 2A–2C in level 2.

Transcoder proxy 28 may invoke the element represented by node 0, thereby obtaining the value "<BODY>" of the element. Transcoder 28 may or may not include the "<BODY>" value in the script.

The element represented by node 1A may have a value which is the HTML tag "<TABLE>". Transcoder proxy 28 may invoke the element represented by node 1A, thereby obtaining the value "<TABLE>" of the element. Transcoder 28 may choose to include the "<TABLE>" value in the script to indicate to the user of client machine 22 that document 12 includes a table.

The element represented by node 2A may have a value which is the HTML tag "<TR>" for table row. Transcoder proxy 28 may invoke the element represented by node 2A, thereby obtaining the value "<TR>" of the element. Transcoder 28 may include the "<TR>" value in the script to indicate to the user of client machine 22 that the table element includes the first row.

The element represented by node 2B may also have a value which is the HTML tag "<TR>" for table row. Transcoder proxy 28 may invoke the element represented by node 2B, thereby obtaining the value "<TR>" of the element. Transcoder 28 may include the "<TR>" value in the script to indicate to the user of client machine 22 that the table element includes the second row.

The element represented by node 2C may have a value "<HEADER>" for table header. Transcoder proxy 28 may invoke the element represented by node 2C, thereby obtaining the value "<HEADER>" of the element. Transcoder 28 may choose to include the "<HEADER>" value in the script to indicate to the user of client machine 22 that the table element includes at least one header.

Referring to FIG. 6, with the element represented by node 1A receiving focus, the selected portion of document 12 using the view depth method may include the elements represented by root node 0 in level 0, nodes 1A and 1B in level 1, and nodes 2A–2F in level 2. This portion of document 12 selected using the view depth method may exceed the display capabilities of output device 24. In this case, transcoder proxy 28 may apply the branch isolation method to the portion of document 12 selected using the view depth method. In doing so, transcoder proxy 28 may select the elements represented by root node 0 and nodes 1A and 2A–2C of subtree 44. Transcoder proxy 28 may invoke the elements represented by these nodes as described above.

It is noted that the results achieved by applying the branch isolation method to the portion of document 12 selected using the view depth method, and applying the view depth method to the portion of document 12 selected using the branch isolation method, are the same.

Figure 8:
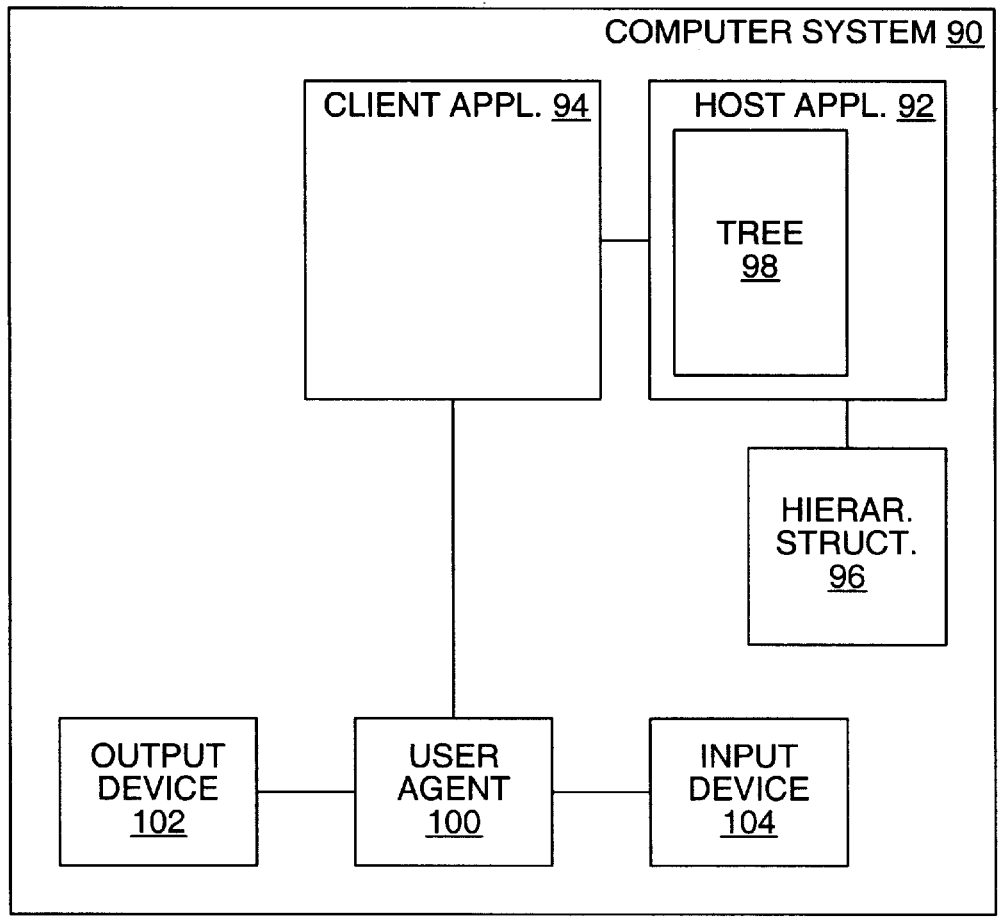
FIG. 8 is a block diagram of a first embodiment of a computer system employing branch isolation and/or view depth methods for presenting a hierarchical structure.

FIG. 8 is a block diagram of a first embodiment of a computer system 90 employing the above described branch isolation and/or view depth methods for presenting a hierarchical structure. Computer system 90 includes a host application 92 coupled to a client application 94. Host application 92 and client application 94 may be separate software programs being executed (i.e., running) simultaneously within computer system 90. Host application 92 may be, for example, a Web browser. Client application 94 may be, for example, an "assistive technology" interface. The term "assistive technology" is used herein to describe technology that helps physically challenged individuals access to a computer system (e.g., computer system 90). Well known types of assistive technologies include "screen readers" which convert display information to speech or Braille, "screen magnifiers" which enlarge features of portions of display screen contents, and voice recognition software which converts speech to a digital representation of text or commands.

In the embodiment of FIG. 8, computer system 90 includes a hierarchical structure 96. In other embodiments, hierarchical structure 96 may be external to computer system 90, and hierarchical structure 96 may be coupled to receive or access hierarchical structure 96. Hierarchical structure 96 includes multiple elements and defines hierarchical relationships between the elements. Each element of hierarchical structure 96 has a presentation property, and a single one of the elements has focus. Hierarchical structure 96 may be, for example, an electronic document such as a Web page. Hierarchical document 96 may also be an interactive application program or a map divided into sections.

Host application 92 is coupled to hierarchical structure 96, and accesses hierarchical structure 96. Host application 92 forms a tree 98, wherein tree 98 is a tree model of hierarchical structure 96. In the embodiment of FIG. 8, tree 98 resides within host application 92. Tree 98 includes nodes and branches as described above.

In order to present a portion of hierarchical structure 96, client application 94 accesses tree 98 within host application 92. Client application 94 may embody the branch isolation method described above. In this case, client application 94 determines a path in the model from the root node to a focus node, wherein the focus node is the node representing the element having focus. Client application 94 generates a set of presentation properties. The set of presentation properties may or may not include the presentation property of the root node for the reasons described above. The set of presentation properties includes the presentation property of each element represented by a node, other than the root node, along the path from the root node to the focus node. The set of presentation properties also includes the presentation property of each element represented by a node in a level lower than the level of the focus node and coupled to the focus node by one or more branches (i.e. in a subtree of tree 98, wherein the focus node is the root node of the subtree).

Alternately, client application 94 may embody the view depth method described above. In this case, the set of presentation properties includes the presentation properties of all elements represented by nodes in the same level as the focus node. The set of presentation properties may also include the presentation properties of all elements represented by nodes in a selected number of levels higher than the level of the focus node. The set of presentation properties may also include the presentation properties of all elements represented by nodes in a selected number of levels lower than the level of the focus node. Client application 94 may also embody a combination of the branch isolation and view depth methods described above.

Client application 94 provides the set of presentation properties to a user agent 100 of computer system 90. Client application 94 may function as an interface between host application 92 and user agent 100. User agent 100 may function as an interface between client application 94 and an output device 102 of computer system 90. Output device 102 may be, for example, a Braille display or a text-to-speech converter. User agent 100 may also function as an interface between client application 94 and an input device 104 of computer system 90. Input device 104 may be, for example, a speech-to-text converter. User agent 100 uses the set of presentation properties to produce output commands, and provides the output commands to the output device. As a result, the desired portion of hierarchical structure 96 is displayed or otherwise presented by output device 102.

Figure 9:
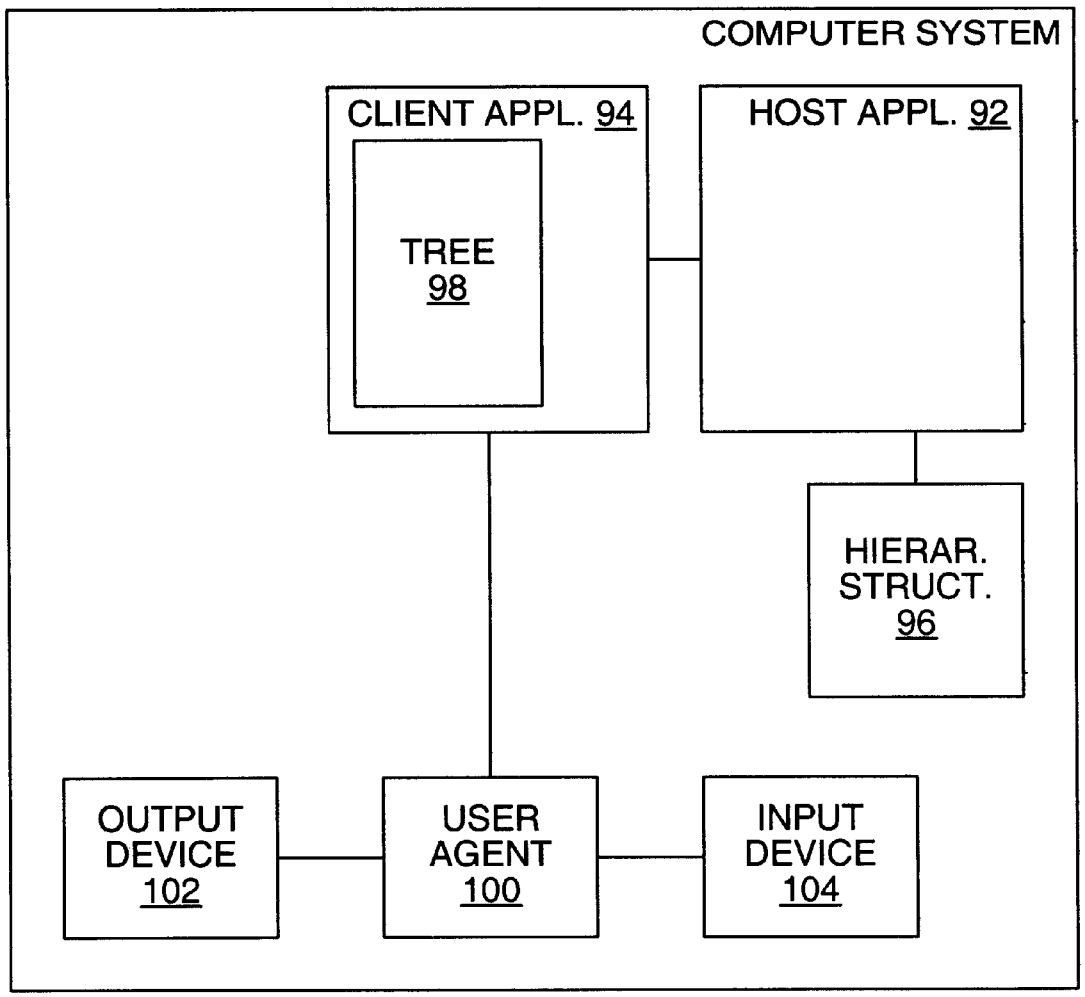
FIG. 9 is a block diagram of a second embodiment of the computer system of FIG. 8.

FIG. 9 is a block diagram of a second embodiment of computer system 90 employing the above described branch isolation and/or view depth methods for presenting a hierarchical structure. In the embodiment of FIG. 9, tree 98 resides within client application 94. Client application 94 accesses hierarchical structure 96 via host application 92, and forms tree 98. Client application accesses tree 98 to form a set of presentation properties as described above, and provides the set of presentation properties to user agent 100.

It will be appreciated by those skilled in the art having the benefit of this disclosure that this invention is believed to be systems and methods for presenting a hierarchical structure. It is intended that the following claims be interpreted to embrace all such modifications and changes and, accordingly, the specification and drawings are to be regarded in an illustrative rather than a restrictive sense.

What is claimed is:

1. A method for presenting an electronic document having a plurality of elements at a client machine having a client application, the method comprising:
   receiving the electronic document in a first digital format, wherein a hierarchical structure of the electronic document defines hierarchical relationships between the plurality of elements, wherein each of the plurality of elements has a presentation property, and wherein a single one of the plurality of elements has focus;
   forming a model of the hierarchical structure comprising a plurality of levels ranked with respect to one another;
   using the model to produce, in a second digital format, an original script having the presentation properties of at least a portion of the plurality of elements;
   selectively presenting, in the original script, the presentation property of the element represented in the hierarchical structure by a root node;
   presenting, in the original script, the presentation property of each element in the hierarchical structure represented by a node along a path from the root node to a focus node representing the element having focus; and
   presenting, in the original script, the presentation property of each element in the hierarchical structure represented by a node in a level lower than the level of the focus node and coupled to the focus node by one or more branches.

2. The method as recited in claim 1, wherein the electronic document is a Web page, an interactive application program, a map, a table having rows and columns, or a document having sections.

3. The method as recited in claim 1, wherein the model is a tree structure, wherein nodes in levels lower than the level of the focus node and coupled to the focus node by one or more branches comprise a subtree of the tree structure, and wherein the focus node is the root node of the subtree.

4. The method as recited in claim 1, wherein the presentation property of a given node is either a value or a function.

5. The method as recited in claim 1, wherein the step of using the model to produce, in a second digital format, an original script having presentation properties of at least a portion of the elements further comprises producing the original script based upon client data indicating the capabilities of the client machine wherein the script contains a portion of the hierarchical structure such that the hierarchical structure presented is within a presentation capability of the client machine.

6. The method as recited in claim 5, wherein the client data comprises at least one of memory size, processing capability, and display size.

7. A method for presenting an electronic document having a plurality of elements at a client machine having a client application, the method comprising:
   receiving the electronic document from a host application coupled to the client application in a first digital format, wherein a hierarchical structure of the electronic document defines hierarchical relationships between the plurality of elements, and wherein a single one of the plurality of elements has focus at a given instance;
   forming a tree model of the hierarchical structure comprising a plurality of levels ranked with respect to one another, a plurality of nodes, and at least one branch, wherein each node represents a single one of the elements, and wherein a single one of the nodes is a root node of the tree model and occupies a highest level, and wherein a given branch connects a first node in a first level to a second node in a level directly below the first level, and wherein each branch represents a hierarchical relationship between the nodes connected by the branch;
   generating, by the client application, a presentation property for each element;
   using the tree model to produce an original script expressed in a second digital format, wherein the original script includes the presentation properties of at least a portion of the plurality of elements;
   using the original script, by a user agent, to produce presentation information for issuing output commands to at least one output device associated with the client machine to effectuate:
      selectively presenting, in the original script, the presentation property of the element represented by the root node;
      presenting, in the original script, the presentation property of each element represented by a node along a path from the root node to the focus node; and
      presenting, in the original script, the presentation property of each element represented by a node in a level lower than the level of the focus node and coupled to the focus node by one or more branches;
   thereby presenting, by the output device, at least a portion of the hierarchical structure of the electronic document.

8. The method as recited in claim 7, wherein the first digital format is a text-based markup language.

9. The method as recited in claim 8, wherein the text-based markup language is hypertext markup language (HTML) or extensible markup language (XML).

10. The method as recited in claim 7, wherein the second digital format is a scripting language.

11. The method as recited in claim 7, further comprising:
   receiving an event, wherein the event signals a change in the element having focus, and in response to the received event:
      using the tree model to produce a new script expressed in the second digital format;

using the new script to produce presentation information to issue new output commands to at least one output device connected to the client machine;

thereby presenting, by the output device, at least a different portion of the hierarchical structure of the electronic document.

12. A method for presenting an electronic document having a plurality of elements at a client machine having a client application, the method comprising:

receiving the electronic document, at a host application coupled to the client application, in a first digital format, wherein a hierarchical structure of the electronic document defines hierarchical relationships between the plurality of elements, and wherein a single one of the plurality of elements has focus;

forming a tree model of the hierarchical structure comprising a plurality of levels ranked with respect to one another, a plurality of nodes, and at least one branch, wherein each node represents a single one of the elements, and wherein a single one of the nodes is a root node of the tree model and occupies a highest level, and wherein a given branch connects a first node in a first level to a second node in a level directly below the first level, and wherein each branch represents a hierarchical relationship between the nodes connected by the branch;

generating, by the client application, a presentation property for each of the plurality of elements;

using the tree model to produce an original script expressed in a second digital format, wherein the original script includes the presentation properties of at least a portion of the plurality of elements represented by nodes:

along a first path from the root node to an original focus node, wherein the original focus node is the node representing the element having focus; and within a first subtree of the tree model, wherein the original focus node is a root node of the first subtree;

using the original script to produce presentation information for issuing output commands to at least one output device associated with the client machine to present the presentation properties within the original script;

generating an event in response to user input, wherein the event signals a change in the element having focus;

using the tree model to produce a new script in response to the event, wherein the new script is expressed in the second digital format and includes the presentation properties of at least a portion of the elements represented by nodes:

along a second path from the root node to a new focus node, wherein the new focus node is the node representing the element having focus as a result of the change in focus signaled by the event; and within a second subtree, wherein the new focus node is a root node of the second subtree; and using the new script to produce presentation information for issuing new output commands to at least one output device associated with the client machine to present the presentation properties within the new script.

13. The methods as recited in claims 7 or 12, wherein the step of using the tree model to produce an original script expressed in a second digital format further comprises producing the original script based upon client data indicating the capabilities of the client machine wherein the script contains a portion of the hierarchical structure such that the hierarchical structure presented is within a presentation capability of the client machine.

14. The method as recited in claim 13, wherein the client data comprises at least one of memory size, processing capability, and display size.

15. A method for presenting an electronic document having a plurality of elements at a client machine having a client application, the method comprising:

receiving an original script, which includes the plurality of elements expressed in a second digital format, wherein a hierarchical structure of the electronic document defines hierarchical relationships between the plurality of elements, wherein each of the plurality of elements has a presentation property, wherein a single one of the plurality of elements has focus, and wherein the original script is derived from a tree model of the hierarchical structure having a first digital format, a plurality of levels ranked with respect to one another and a plurality of nodes, and wherein each node represents a single one of the plurality of elements, and wherein the original script includes the presentation properties of elements represented by nodes:

along a first path from the root node to an original focus node, wherein the original focus node is the node representing the element having focus; and within a first subtree of the tree model, wherein the original focus node is a root node of the first subtree; and presenting, in the second digital format, the presentation properties within the original script.

16. The method as recited in claim 15, further comprising:

generating an event in response to user input, wherein the event signals a change in the element having focus;

providing the event;

receiving a new script expressed in the second digital format and derived from the tree model, wherein the new script includes the presentation properties of at least a portion of the plurality of elements represented by nodes:

along a second path from the root node to a new focus node, wherein the new focus node is the node representing the element having focus as a result of the change in focus signaled by the event; and within a second subtree, wherein the new focus node is a root node of the second subtree; and presenting, in the second digital format, the presentation properties within the new script.

17. A system for presenting a hierarchical structure, comprising:

a transcoder proxy configured to:

receive the hierarchical structure expressed in a first digital format, wherein the hierarchical structure includes a plurality of elements and defines hierarchical relationships between the elements, and wherein each element has a presentation property, and wherein a single one of the elements has focus;

form a tree model of the hierarchical structure comprising a plurality of levels ranked with respect to one another, a plurality of nodes, and at least one branch, wherein each node represents a single one of the elements, and wherein a single one of the nodes is a root node of the tree model and occupies a highest level, and wherein a given branch connects a first node in a first level to a second node in a level directly below the first level, and wherein each branch represents a hierarchical relationship between the nodes connected by the branch;

use the tree model to produce an original script expressed in a second digital format, wherein the original script includes the presentation properties of at least a portion of the elements represented by nodes:
along a first path from the root node to an original focus node, wherein the original focus node is the node representing the element having focus; and
within a first subtree of the tree model, wherein the original focus node is a root node of the first subtree; and
provide the original script; and
a client machine coupled to the transcoder proxy, wherein the client machine comprises:
an output device; and
a user agent coupled to the output device and configured to:
receive the original script;
form presentation information in response to the original script, wherein the presentation information includes the presentation properties within the original script;
use the presentation information to produce output commands; and
provide the output commands to the output device.

18. The system as recited in claim 17, wherein the user agent of the client machine is further configured to:
generate an event in response to user input, wherein the event signals a change in the element having focus; and
provide the event.

19. The system as recited in claim 18, wherein the transcoder proxy is further configured to:
receive the event;
use the tree model to produce a new script in response to the event and expressed in the second digital format, wherein the new script includes the presentation properties of at least a portion of the elements represented by nodes:
along a second path from the root node to a new focus node, wherein the new focus node is the node representing the element having focus as a result of the change in focus signaled by the event;
within a second subtree, wherein the new focus node is a root node of the second subtree; and
provide the new script.

20. The system as recited in claim 19, wherein the user agent of the client machine is further configured to:
receive the new script; and
modify the presentation information in response to the new script.

21. A method for presenting a hierarchical structure, comprising:
accessing the hierarchical structure, wherein the hierarchical structure includes a plurality of elements and defines hierarchical relationships between the elements, and wherein each element has a presentation property, and wherein a single one of the elements has focus;
forming a model of the hierarchical structure comprising a plurality of levels ranked with respect to one another, a plurality of nodes, and at least one branch, wherein each node represents a single one of the elements, and wherein a single one of the nodes is a root node and occupies a highest level, and wherein a given branch connects a first node in a first level to a second node in a level directly below the first level, and wherein each branch represents a hierarchical relationship between the nodes connected by the branch;

selecting a first portion of the model, comprising:
nodes along a path in the model from the root node to a focus node, wherein the focus node is the node representing the element having focus; and
nodes in a level lower than the level of the focus node and coupled to the focus node by one or more branches;
selecting a second portion of the model, comprising:
nodes in the same level as the focus node; and
nodes in a selected number of levels lower than the level of the focus node; and
presenting the presentation properties of elements represented by nodes within both the first and second portions of the model.

22. The method as recited in claim 21, wherein the path is a route from the root node to the focus node formed along branches.

23. The method as recited in claim 21, wherein the root node is within both the first and second portions of the model, and wherein the presentation property of the element represented by the root node is selectively presented.

24. A computer system configured to receive an electronic document having a plurality of elements expressed in a first digital format and present the electronic document expressed in a second digital format, comprising:
a host application configured to:
access a hierarchical structure of the electronic document expressed in the first digital format, wherein the hierarchical structure defines hierarchical relationships between the plurality of elements, wherein each of the plurality of elements has a presentation property, and wherein a single one of the plurality of elements has focus;
form a model of the hierarchical structure comprising a plurality of levels ranked with respect to one another, a plurality of nodes, and at least one branch, wherein each node represents a single one of the elements, and wherein a single one of the nodes is a root node and occupies a highest level, and wherein a given branch connects a first node in a first level to a second node in a level directly below the first level, and wherein each branch represents a hierarchical relationship between the nodes connected by the branch;
a client application coupled to the host application and configured to:
access the model of the hierarchical structure;
determine a path in the model from the root node to a focus node, wherein the focus node is the node representing the element having focus;
use the model to produce, in the second digital format, an original script having a set of presentation properties, wherein the set of presentation properties comprises:
the presentation property of each element represented by a node, other than the root node, along the path from the root node to the focus node; and
the presentation property of each element represented by a node in a level lower than the level of the focus node and coupled to the focus node by one or more branches; and
provide the set of presentation properties;
an output device; and
a user agent coupled to the output device and to receive the set of presentation properties, wherein the user agent is configured to:

use the set of presentation properties to produce output commands; and provide the output commands to the output device.

25. The computer system as recited in claim 24, wherein the host application is a Web browser.

26. The computer system as recited in claim 24, wherein the client application is an assistive technology which functions as an interface between the host application and the user agent.

27. The computer system as recited in claim 24, wherein the user agent functions as an interface between the client application and the output device.

28. The computer system as recited in claim 24, wherein the output device is a Braille display or a text-to-speech converter.

29. The computer system as recited in claim 24, further comprising an input device coupled to the user agent.

30. The computer system as recited in claim 29, wherein the input device is a speech-to-text converter.

31. A computer system configured to receive an electronic document having a plurality of elements expressed in a first digital format and present the electronic document expressed in a second digital format, comprising:

a host application;

a client application coupled to the host application and configured to:

access a hierarchical structure of the electronic document expressed in the first digital format via the host application, wherein the hierarchical structure defines hierarchical relationships between the plurality of elements, wherein each of the plurality of elements has a presentation property, and wherein a single one of the plurality of elements has focus;

form a model of the hierarchical structure comprising a plurality of levels ranked with respect to one another, a plurality of nodes, and at least one branch, wherein each node represents a single one of the elements, and wherein a single one of the nodes is a root node and occupies a highest level, and wherein a given branch connects a first node in a first level to a second node in a level directly below the first level, and wherein each branch represents a hierarchical relationship between the nodes connected by the branch;

determine a path in the model from the root node to a focus node, wherein the focus node is the node representing the element having focus;

use the model to produce, in the second digital format, an original script having a set of presentation properties, wherein the set of presentation properties comprises:

the presentation property of each element represented by a node, other than the root node, along the path from the root node to the focus node; and the presentation property of each element represented by a node in a level lower than the level of the focus node and coupled to the focus node by one or more branches; and provide the set of presentation properties;

an output device; and a user agent coupled to the output device and to receive the set of presentation properties, wherein the user agent is configured to:

use the set of presentation properties to produce output commands; and provide the output commands to the output device.

* * * * *